United States Patent

[11] 3,591,910

| [72] | Inventor | Byron L. Brucken<br>Dayton, Ohio |
|---|---|---|
| [21] | Appl. No. | 868,516 |
| [22] | Filed | Oct. 22, 1969<br>Division of Ser. No. 501,991, Oct. 22, 1965, Pat. No. 3,482,298 |
| [45] | Patented | July 13, 1971 |
| [73] | Assignee | General Motors Corporation<br>Detroit, Mich. |

[54] METHOD OF MANUFACTURE OF WIRE FIN AND TUBE HEAT EXCHANGER
6 Claims, 15 Drawing Figs.

| [52] | U.S. Cl. | 29/202 D, 29/157.3, 140/92.2, 228/17 |
|---|---|---|
| [51] | Int. Cl. | B23p 15/16 |
| [50] | Field of Search | 29/202, 157.3, 202 D; 140/92.2; 228/17 |

[56] References Cited
UNITED STATES PATENTS

| 3,114,963 | 12/1963 | Kritzer | 29/202 |
|---|---|---|---|
| 3,217,392 | 11/1965 | Roffelsen | 29/157.3 |
| 3,265,276 | 8/1966 | Roffelsen | 228/17 |
| 3,353,250 | 11/1967 | Kikuchi et al. | 140/92.2 X |

*Primary Examiner*—Thomas H. Eager
*Attorneys*—William S. Pettigrew and J. C. Evans ABSTRACT: In the preferred form, a machine for making a heat exchanger by wrapping wire on the periphery of a tube including a tube-rotating head assembly adapted to rotate the tube and advance it in an axial direction. A winding spindle head encircles the advancing tube and rotates with respect to the tube to form continuous loops on the tube having a portion bent around the tube and a portion located radially outwardly of the tube.

Fig. 1

INVENTOR.
Byron L. Brucken
BY
J.C. Evans
His Attorney

INVENTOR.
Byron L. Brucken
BY
J.C. Evans
His Attorney

INVENTOR.
Byron L. Brucken
BY J.C. Evans
His Attorney

PATENTED JUL 1 3 1971

INVENTOR.
Byron L. Brucken
BY
J. C. Evans
His Attorney

Fig. 14

INVENTOR.
Byron L. Brucken
BY
J.C. Evans
His Attorney

METHOD OF MANUFACTURE OF WIRE FIN AND TUBE HEAT EXCHANGER

This is a division of Ser. No. 501,991 filed Oct. 22, 1965 now U.S. Pat. No. 3,482,298, granted Dec. 9, 1969.

This invention is directed to a wire fin and tube heat exchanger and more particularly to a wire fin and tube heat exchanger having an extended wire fin surface.

Heat exchangers of the type having an extended heat transfer area, such as are commonly used as evaporators in refrigerators, air conditioners and the like, are often characterized by the provision of a large number of separate parts that make up the heat exchanger unit. For example, in many cases, a plurality of fins are separately mounted with respect to the tubing of the heat exchanger to produce an extended heat transfer surface capable of performing a given heat transfer function within a limited volume of heat exchanger unit. Another way of increasing the heat transfer surface in a heat exchanger is by the provision of a wire fin surface thereon. Wire fin-type heat exchangers have taken many forms, but to a greater or lesser degree have all required rather complex methods of manufacture to produce the resultant article.

An object of the present invention is to provide an improved machine for the manufacture of a heat exchanger having an extended wire surface on the outer periphery of tube passes including means for continuously advancing the tube through aligned stations, means for bending a wire fin around an arcuate extent of the outer periphery of the tube and thereafter locating a part of the wire fin radially outwardly of the tube to form an airflow passageway; the machine further includes means to bond the wire fin that is bent on the arcuate segment of the tube thereto.

A further object of the present invention is to provide an improved machine for the manufacture of an extended surface heat exchanger having in line stations for continuous operation and including a rotatable pair of pulleys engaging the tube and rotatable with respect to the tube for moving it axially through a wire-forming spindle; the spindle including a rotatable head having a pair of spaced-apart pins thereon to bend wire around the advancing tube and to locate parts of the wire radially of the tube.

Further objects and advantages of the present invention will be apparent from the following description, reference being had to the accompanying drawings wherein preferred embodiments of the present invention are clearly shown.

Referring now to FIGS. 1 through 5, an improved machine for manufacturing an extended surface heat exchanger of the wire fin-type is illustrated as including a coating station 20, a winding station 22, and a heat-treating station 24.

Figure 1:
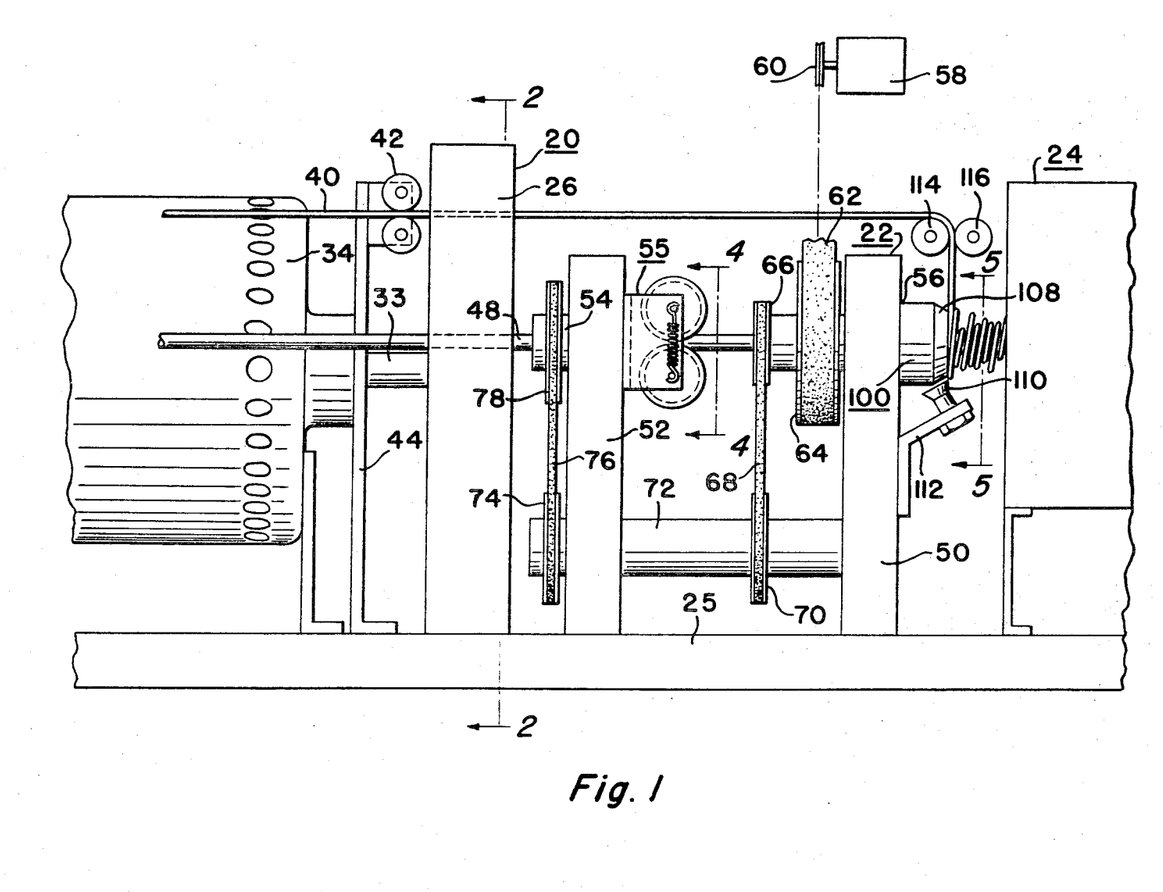
FIG. 1 is a view of a plural station machine for manufacturing one embodiment of the present invention in accordance with an improved method of manufacture of the article.
Figures 2, 3, 4, 5:
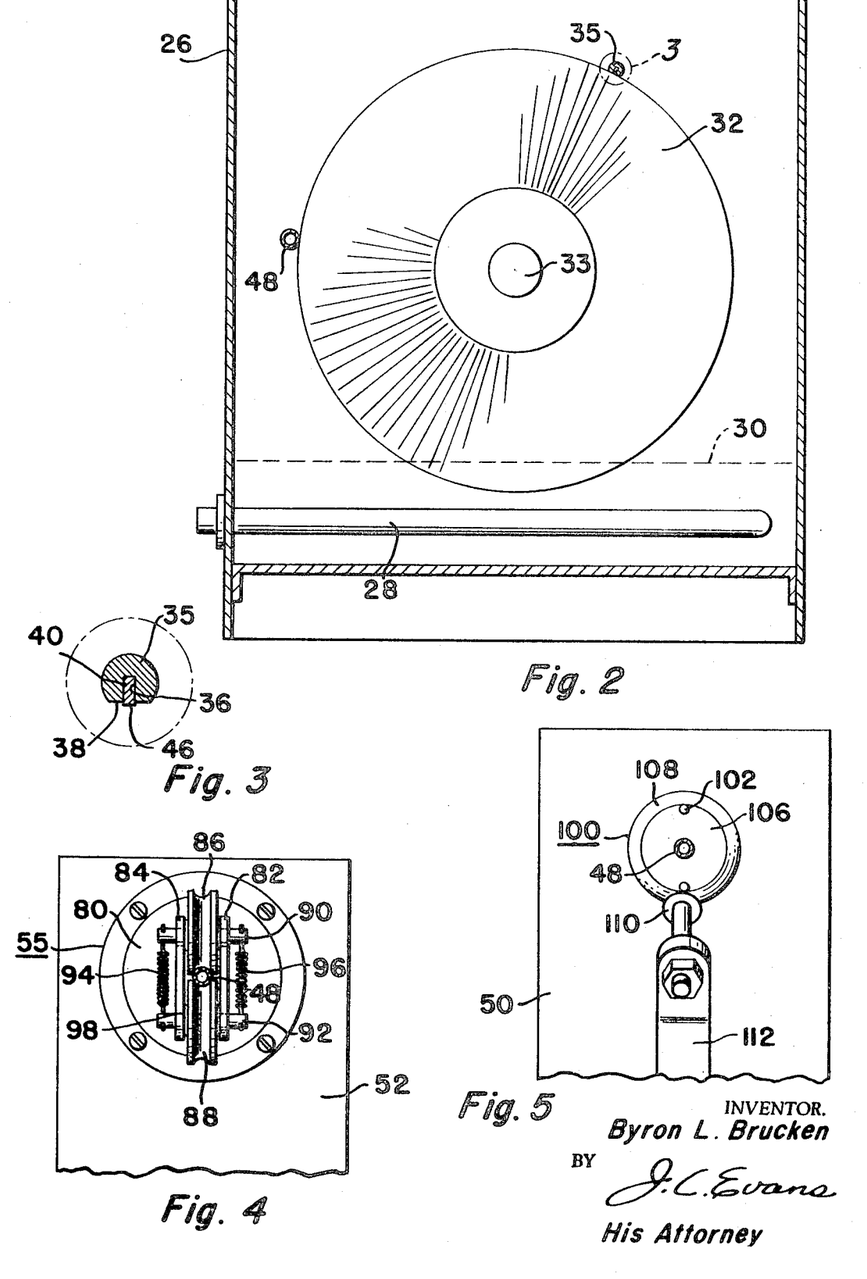
FIG. 2 is an enlarged view in vertical section taken along the line 2-2 of FIG. 1.
FIG. 3 is an enlarged view in vertical section of the region 3 in FIG. 2.
FIG. 4 is an enlarged view in vertical section taken along the line 4-4 of FIG. 1.
FIG. 5 is an enlarged view in vertical section taken along the line 5-5 of FIG. 1.

The coating station 20 is illustrated in the machine of FIGS. 1 through 5 as including a container 26 having a heater 28 in the bottom thereof that maintains a predetermined temperature in the container for melting a suitable bonding material, for example a tin solder, which is maintained at the level 30 in the container 26, as shown in FIG. 2.

Within the container 26 is located a wire wheel 32 having a portion of the periphery thereof located below the level 30 of the solder in the container 26. The wire wheel 32 is supported on a shaft 33 that is directed through one of the sidewalls of the container 26 to be drivingly connected to a motor 34 for rotating the wheel 32 within the container 26. As the wheel 32 rotates, it is moved with respect to an insert member 35 that is best seen in FIG. 3 as having a groove 36 formed therein and a flattened surface 38 thereon that is located in a tangent relationship with the outer periphery of the wire wheel 32. A length of wire 40 is fed through a pair of rollers 42 supported on a frame member 44. The rollers 42 are configured to flatten one surface of the wire 40 as at 46, as shown in FIG. 3. The flattened surface 46 of the wire 40 is directed from the rollers 42 through the front wall of the container 26 and into the insert 35 that locates the flat surface 46 of the wire 40 tangent to the wheel 32.

In addition, an elongated, tubular member 48 is directed through the walls of the container 26 so that the outer surface thereof is located tangent to the wheel 32 as seen in FIG. 2.

The winding station 22 includes an end frame 50 and an end frame 52 supported by the base 25 at spaced-apart points thereon. Within the base member 52 is rotatably supported a first tubular guide member 54 that has a tube-rotating head assembly 55 secured on one end thereof. A second rotatable tubular guide member 56 is rotatably supported on the frame member 50 in axial alignment with the first rotatable guide member 54. The tubular guide member 56 is rotated relative to the frame member 50 by an electric motor 58 that has a drive pulley 60 thereon with a belt 62 passing thereover that drivingly engages a driven pulley 64 on an inboard end of the tubular guide member 56. At the innermost end of the tubular guide member 56 is located a speed increasing pulley 66 that has a belt 68 passed thereover to engage a pulley 70 on a speed-transfer shaft 72 having the opposite ends thereof journaled respectively in the frame members 50 and 52. An outboard end of the shaft 72 has a pulley 74 thereon over which a belt 76 passes to engage a pulley 78 on the outboard end of the first tubular guide member 54 for causing rotation of the tube-rotating head assembly 55.

The tube-rotating head assembly 55, more particularly, includes a baseplate 80 on the inboard end of the tubular guide member 54 which has a pair of spaced-apart flanges 82, 84 thereon as best seen in FIG. 4. The tubular member 48 is directed from the soldering station 20 interiorly of the guide member 54 and thence between the flanges 82, 84 to be engaged by a pair of rollers 86, 88 that coact to serve as jaws for clamping the tubular member 48 for rotation through which the head assembly 55. The rollers 86, 88 are supported on shafts 90, 92, respectively, each of which is directed through the spaced-apart flanges 82, 84 for supporting the rollers 86, 88 on the flanges 82, 84. The ends of the shafts 90, 92 are interconnected by spring members 94, 96, respectively, to bias the rollers 86, 88 into frictional engagement with the tube 48 whereby on rotation of the guide member 54 and head assembly 55, the tube 48 is rotated at a predetermined rate as established by the belt-pulley system between motor 58 and the rotatable guide member 54. Openings 98 in the flanges 82, 84 through which the ends of the shafts 90, 92 pass are slotted to provide for good press fit of the rollers 86, 88 against the tubular member 48 passing therebetweeen.

The tubular member 48 is directed from the tube-rotating head assembly 55 into the inboard end of the second tubular guide member 56 that is rotatably supported on the frame member 50.

The tubular member 48 is directed through the guide member 56, thence through a hollow winding spindle head 100 that includes diametrically spaced pins 102, 104 on the outer periphery of the end face 106 thereof. The face 106 is located forwardly of a tapered surface 108 on the winding spindle head 100.

Figure 6:
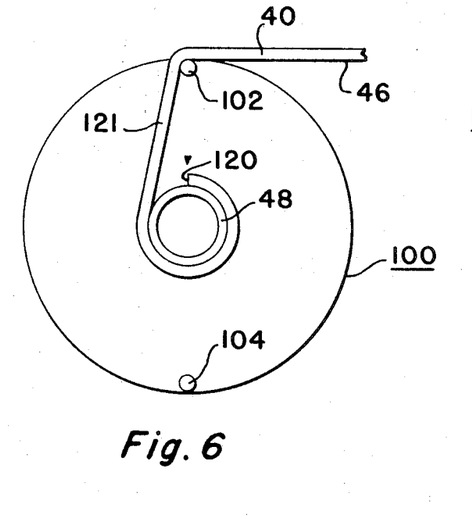
FIG. 6 is an enlarged view in front elevation of a winding spindle in the present invention showing the tube and wire at one stage of manufacture thereof.

One embodiment of the improved process of the present invention includes feeding the wire 40 and tubular member 48 through the solder container 26 so that the flat edge 46 of the wire 40 is coated with solder and the outer periphery of the tubular member 48 is coated with solder. The wire and tubular member are fed through the wire feed and winding stations, respectively, so that an end of the tubular member 48 is directed from the outboard end of the spindle-winding head 100 and the wire is passed through the directional rollers 114, 116 about winding headpin 102 as seen in FIG. 6. An end 120 of the wire 40 is connected to the periphery of the tube 48, as shown in FIG. 6, at the start of the winding step of the improved process. The motor 58 is energized to cause relative rotation of the head 100 and the tube 48 with the tube 48 being rotated by the roller head assembly 55 in the illustrated machine at a predetermined increased speed with respect to the speed of rotation of the head 100.

In FIGS. 6 through 11, various stages of the winding are specifically set forth, including the initial step of connecting the wire to the tube, as shown in FIG. 6, at which point the head and tube are at their initial starting point with the wire 40 being wrapped about the outer periphery of the tube 48 with the flat surface 46 of the wire 40 being in contact with the outer circumference of the tube 48 from the point 120 to a point tangent to the tube thence to pass about the pin 102 back to rollers 114, 116.

Figure 7:
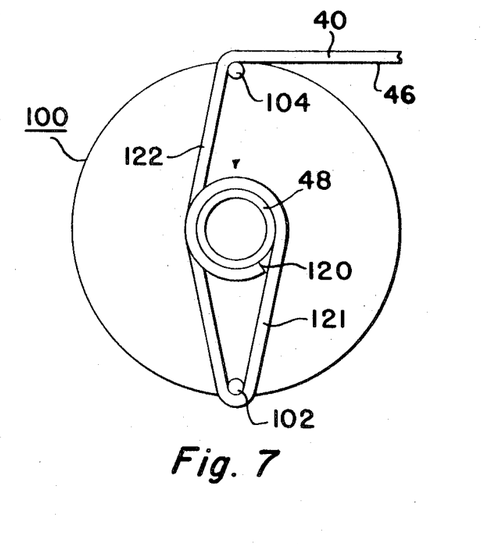
FIG. 7 is a view like FIG. 6 showing a subsequent stage of manufacture.

As shown in FIG. 7, when the head is rotated 180° from the portion in FIG. 6, the pin 102 draws a reach of wire 122 onto the head between the pins 102, 104. The tube, because of the greater rate of rotation thereof, is advanced 34° ahead of the head 100.

Figure 8:
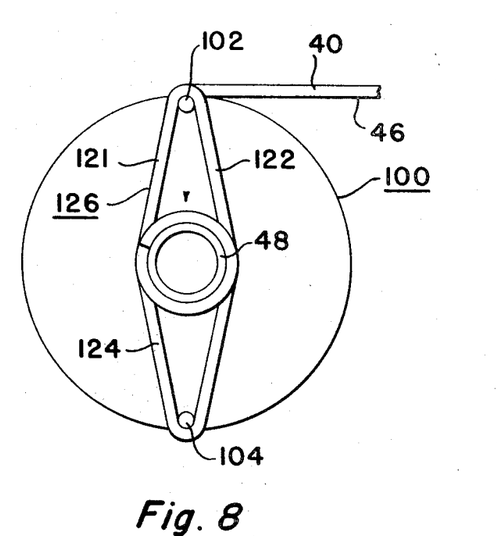
FIG. 8 is a view like FIG. 6 showing a still further step in the manufacture of the invention.

In FIG. 8, a further stage of the winding step is illustrated wherein the head 100 has been rotated 360° from its initial portion and the tube rotated 360° plus 68° representing the greater rate of rotation of the tube. At this time the reach of wire 122 about the pins 102, 104 is orbited about the axis of tubular member 48 into the position shown in FIG. 8, and an additional reach of wire 124 is drawn by the pin 104 across the pin 102 behind the reach 122 and the lead reach 121. Upon the rotation, as shown in FIGS. 7 and 8, the greater rate of rotation of the tube causes the lead reach 121, in part, to be wrapped around the outer circumference of the tube 48 so as to draw the reach 122 from the pin 104 and around the pin 102. Eventually this drawing action will cause the reach of wire 122 ro be bent about the outer circumference of the tubular member 48 through an increasing angle.

Figure 9:
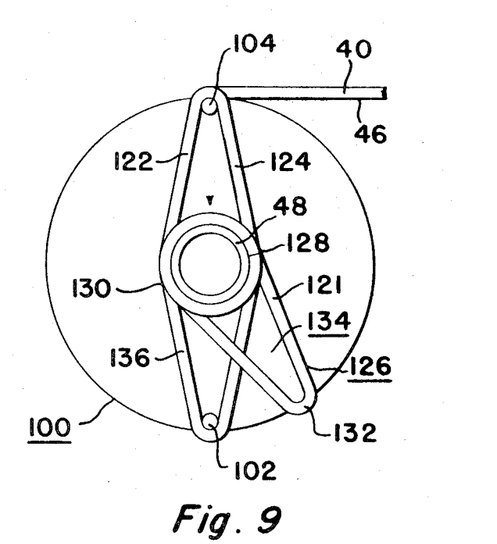
FIG. 9 is a step of the manufacture advanced from that shown in FIG. 8.

As shown in FIG. 9, when the head 100 has rotated 180° from the position shown in FIG. 8 into its second turn, the lead reach 121 and the part of the reach 122 that is connected thereto are released from the head 100 by the wire-camming element 110 to form a first loop 126 on the outer circumference of the tubular member 48. The first loop 126 is characterized by having bent ends 128, 130 thereon located in good heat transfer contact with the outer surface of the tubular member 48 and an apex portion 132 located radially outwardly of the outer circumference of the tube 48 to form an airflow passageway 134 between the loop 126 and the tubular member 48. At the stage of the winding shown in FIG. 9, the reach 124 is located with respect to the tubular member 48 as was the reach 122 in the stage shown in FIG. 8, and another reach of wire 136 is drawn by the pin 102 about the pin 104 rearwardly of the reach 124.

Figure 10:
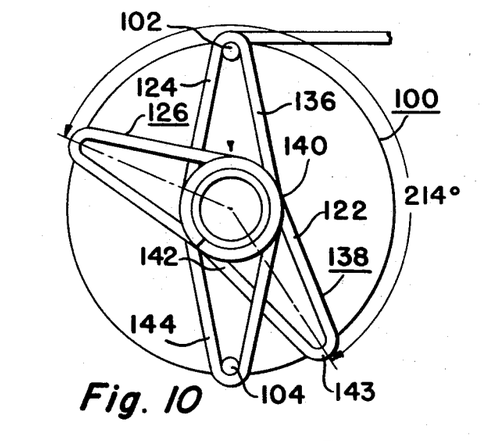
FIG. 10 is a step advanced from that shown in FIG. 9.

Following the formation of a first loop 126, as shown in FIG. 9, when the head has been rotated 360° in its second turn, the wire loop 126 is positioned, as illustrated in FIG. 10, and the reach of wire 124 is bent around the outer periphery of the tubular member 48. At this time the portion of the reach of wire 124 connected to the reach of wire 122 is released from the head 100 by the wire-camming element 110 to form a second loop 138 having end portions 140, 142 bent into good heat transfer contact with the outer circumference of the tubular member 48 on a portion of the circumference of the tubular member located behind that portion contacted by the ends 128, 130 of the loop 126. The loop 138 has an apex portion 143 like that of loop 126.

The loop 138 is angularly offset from the loop 126 through an angle of approximately 214° in the illustrated embodiment of the invention.

At the stage of winding shown in FIG. 10, the reach of wire 136 is orbited by head 100 about tubular member 48 and positioned as shown, and another reach of wire 144 is drawn by the pin 104 across the pin 102 behind the reach 136 on the head 100.

Figure 11:
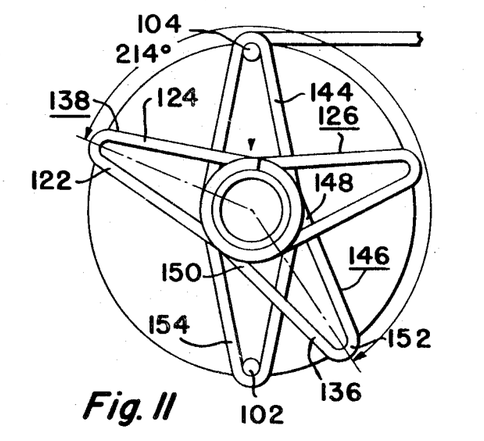
FIG. 11 is a step advanced from that shown in FIG. 10.

Upon a 180° portion of turn number three, as shown in FIG. 11, the loops 126 and 138 are positioned as shown and an additional loop 146 is formed by parts of the reaches 24 and 136 as were loops 126 and 138 as previously discussed. The loop 146, like the previous loops, has end portions 148, 150 that are bent about the outer circumference of the tubular member 48, and it, additionally, includes an apex 152 like those in the previously formed loops. At this stage of the winding, the reach 144 is positioned as illustrated and a still further reach 154 is carried by the pin 102 across the pin 104 onto the head 100 rearwardly of the reach 144. The added loop 146 is angularly offset from the last formed loop 138 through an angle of 214° as shown in FIG. 11.

Further rotation of the head and tube with respect to one another produces a continuous formation of angularly offset loops on the tubular member 48 with succeeding loops having the same angular displacement with respect to one another and being located at axially spaced points on the length of the tubular member 48. The formation of the loops and the releasing action of the camming element 100 pulls the tubular member 48 through the winding station 22 and directs the wound wire and tube into the heating station 24 where the solder is heated to its melt temperature to cause the contacting portions of the wire and tubular member to be fused one to the other by a layer of bonding agent 155, as seen in FIG. 13, for mechanically securing the wound wire on the tubular member.

Figure 12:
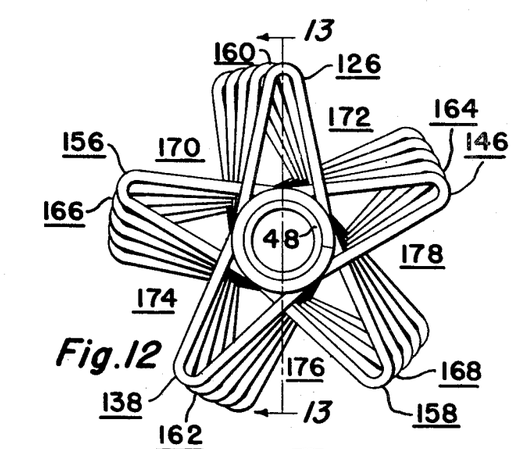
FIG. 12 is a view in end elevation of the assembled tube and wire heat exchanger of the present invention showing a portion of the formed loops thereon.
Figure 13:
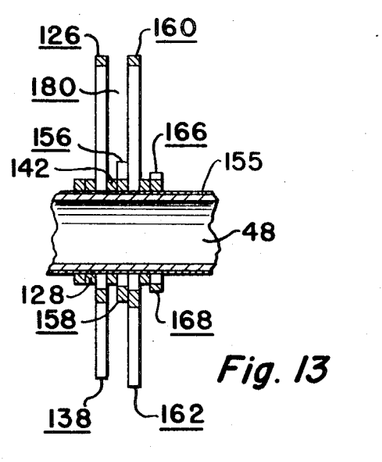
FIG. 13 is a vertical, sectional view taken along the line 13-13 of FIG. 12.

In FIGS. 12 and 13, a number of the finished loops on the tubular member 48 are illustrated including the sequentially formed loops 126, 138, 146 and succeeding loops 156, 158. These loops, in one form of the present invention, constitute a five-point loop system which is repeated upon continually rotating the wire and tube at loops 160, 162, 164, 166 and 168. It will be noted that by preselecting a particular angle between the succeeding loops the formed periphery of in each set of five points are angularly offset from one another. Thus, in FIG. 12, the initial loops that are located on the top of the tubular member eventually curve downwardly about the outer circumference of the tubular member 48 so that the space 170 bounded by the top loops 126, 160 and side loops 156, 166 moves in a counterclockwise curvilinear fashion about the outer periphery of the tubular member and likewise the space 172 between the top loops 126, 160 and the opposite side loops 146, 164 moves upwardly in a counterclockwise direction about the outer of the tube. Spaces 174, 176 and 178 between other of the loops move in a similar curvilinear fashion about the outer circumference of the tubular member 48 along the length thereof.

By virtue of this arrangement, when the wire fin and tubular member are located in certain environments, for example, as an evaporator section in a frostproof refrigerator, when cold moist air is passed over certain of the loops, as for example the loops 126, 160, so as to deposit frost thereon to close a gap 180 therebetween, and assuming that airflow is passing from the space 170 to the space 172, as seen in FIG. 12, when the flow passageways 180 are blocked, the space 170 will provide relief for the airflow about the wire fin tube section so that cold air will be continually circulated in the system.

Figure 14:
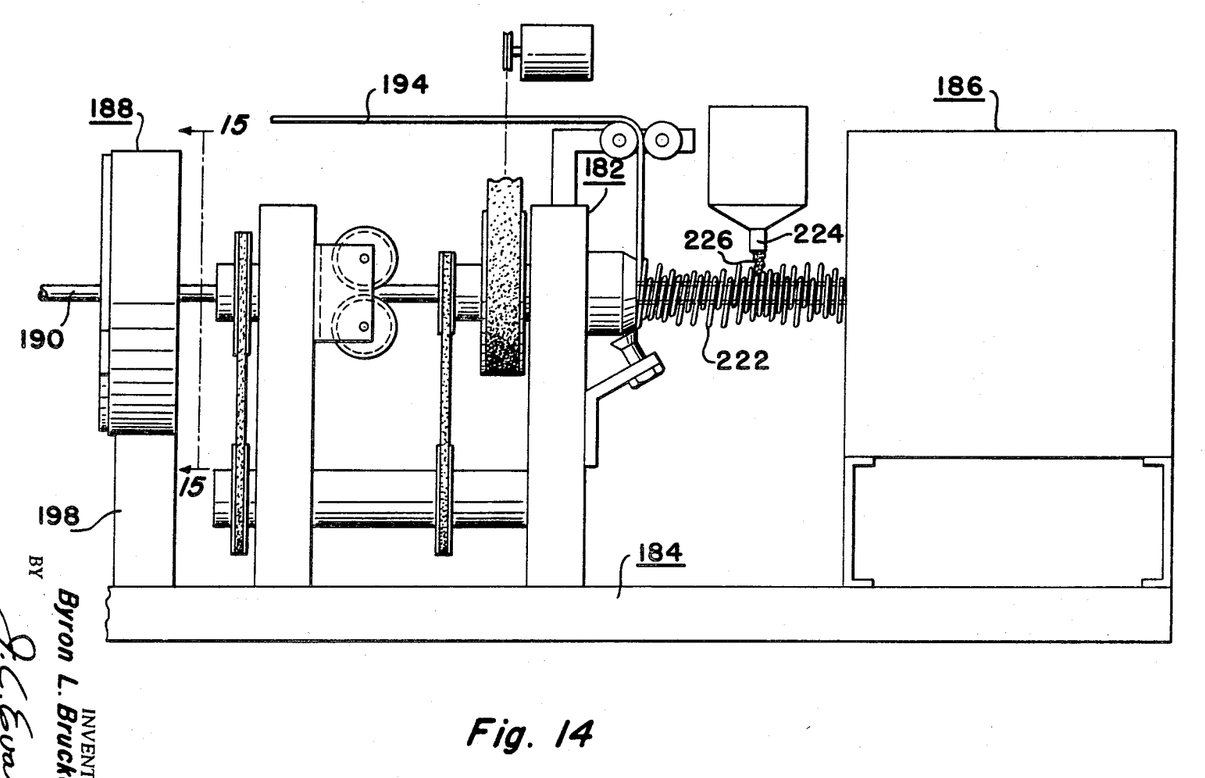
FIG. 14 is a view of a machine for carrying out the steps of another embodiment of the improved process of the present invention.
Figure 15:
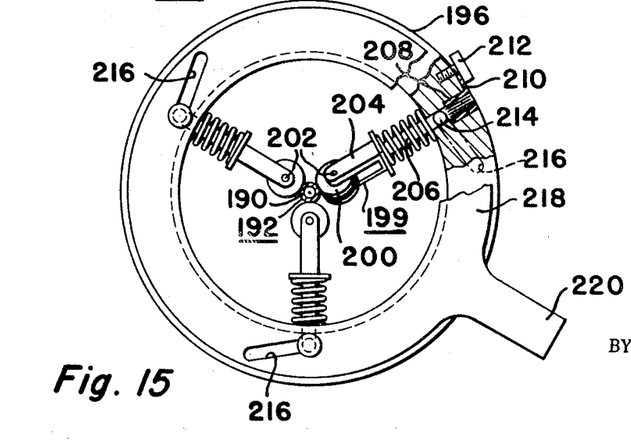
FIG. 15 is a view in vertical section taken along the line 15-15 of FIG. 14.

Referring now to FIGS. 14 and 15, another machine arrangement constructed in accordance with the present invention is illustrated for carrying out another embodiment of the process of the present invention. In this arrangement, a winding station 182 illustrated identical to the winding station 22 of the first embodiment. The winding 182 is mounted on a base 184 between a heating station 186 and a variable advance mechanism 188. In this arrangement, a tubular member 190, like tubular member 48, is directed through a central opening 192 in the variable advance mechanism 188 to be received by the winding station 182 in the same fashion as was the tubular member 48 in the first embodiment. A length of wire 194 is directed to the winding station 182 as was the wire 40 in the first embodiment. In this arrangement, however, the wire 194 and tubular member 190 are moved with respect to one another to carry out the winding of the wire 194 on the tubular member 190 prior to application of bonding material thereon.

The variable advance mechanism 188 is set forth more specifically in FIG. 15 as including an annular member 196 secured on a frame member 198 supported by the base 184. At circumferentially located points on the member 196 are located tube-gripping roller assemblies 199. Each of the assemblies 199 includes a roller 200 rotatably supported by a pin 202 in a bifurcated arm 204 on the end of a shaft 206 that has a splined end thereof received within a bushing 208 rotatably supported within the fixed member 196. The outer end of the bushing 208 has a calibrated disc 210 secured thereto that is adjustable with respect to the fixed member 196 for rotating the shaft 206 relative to the fixed member 196 for varying the skew of the roller 200 with respect to the tubular member 190. When a predetermined skew relationship between the roller 200 and the tubular member 190 is selected, a clamp screw 212 is fastened to the fixed member 196 for holding the tubular bushing 208 and shaft 206 in a predetermined angular relationship with the fixed member 196. A follower pin 214 is secured to the shaft 208 and directed through a cam opening 216 in a movable release ring 218 having an actuating arm 220 thereon. When the arm 220 is moved to rotate the release ring 218 with respect to the annular fixed member 196, the follower pin 214 is moved by the camming groove 216 so as to axially move the splined shaft 206 in the bushing 208 to release the skewed rollers 200 from the tubular member 190.

The amount of skew of the rollers with respect to the tubular member 190 will cause a greater or lesser rate of advance of the tubular member 190 into the winding station 182.

Accordingly, the rate of advance of the tubular member 190, with respect to the wire 194 being wound thereon, is variable whereby the wire loops formed on the outer circumference of the tubular member 190 can be spaced at preselected points along the length of the tube 190 to provide a greater or lesser spacing therebetween.

In the process carried out on the machine arrangement of FIG. 14, once the wire 194 is wound on the tubular member 190, the extended surface assembly 222 is moved with respect to a nozzle 224 for distributing a strip of bonding material 226 along the length of the completed article 222. The coated wire and tubular member 22 are then passed interiorly of the heating station 186 for causing the bonding material to flow into the contacting surfaces between the wound wire and the tubular member for physically connecting them together.

In one process the tubular member is formed of aluminum and the wire of aluminum. The bonding material distributed by the nozzle 224 is a reaction flux including the following ingredients: zinc chloride 44 ounces per weight, ammonium chloride 5 ounces per weight, sodium fluoride 1 ounce per weight, water (soft or treated) 5.75 ounces per weight. The flux material is mixed as a homogeneous mass and during usage, water is added to maintain proper working consistency. The flux is applied as a strip to coat the tube and wire by flow coating.

The coated aluminum tube and wire assembly is heated between the temperatures of 750° F. to 800° F. to react to the flux so that the metallic material therein flows into the contacting surfaces between the wire and tube to connect the wire securely to the tube.

While in the illustrated arrangement, the heating station is shown representatively as being a furnace, the invention can be practiced by heating the reaction flux with a torch or by induction heating of the wire and tube assembly.

Following reaction of the flux, the residues of the flux are removed by washing the tube with hot water and applying heat to the tube. If a bright finish is desired, the tube and wire can be subjected to a cleaning operation, as for example by passing it to a nitric acid solution followed by a clean water rinse drying operation as necessary.

While the embodiments of the present invention as herein disclosed constitute preferred forms, it is to be understood that other forms might be adopted.

What I claim is as follows:

1. A machine for forming an extended wire fin and tube heat exchanger comprising, means for advancing a tube in a linear direction, means for feeding wire to a point tangent to the tube, means for looping predetermined portions of the wire with respect to tube whereby a portion of the wire is bent around an arcuate portion of the outer circumference of the tube and another portion of the wire is formed as an apex of the loop radially outwardly of the tube, and means for varying the advance of the tube to form a plurality of constantly angularly offset loops on the tube at spaced-apart points along the length of the tube.

2. A machine for forming an extended surface wire fin and tube heat exchanger comprising, means for continuously precoating a length of wire and the outer surface of a tube with a bonding agent, means for relatively rotating the wire with respect to the tube, means for looping predetermined portions of the wire with respect to the tube whereby a portion of the wire is located in contact with an arcuate segment on the outer circumference of the tube and another portion of the wire is formed as an apex of the loop radially outwardly of the tube, and means for continuously advancing the tube in a predetermined direction and for feeding the wire with respect to the tube to form a plurality of constantly angularly offset loops on the tube.

3. A machine for forming an extended surface wire and tube heat exchanger comprising, means for relatively rotating a tube and a length of wire with respect to one another, means for looping predetermined portions of the wire with respect to the tube to form continuously angularly advanced loops bent on an arcuate segment of the outer surface of the tube along the length thereof, and including a loop portion spaced radially outwardly of the tube, means for applying bonding material to the length of the wire and tube, and means for heating the bonding material to join the contacting surfaces of the wire and tube.

4. A machine for forming an extended surface wire and tube heat exchanger comprising, means for relatively differentially rotating the tube and wire with respect to one another, means for looping predetermined portions of the wire with respect to the tube to form continuously angularly advanced loops on the outer surface of the tube along the length thereof, and means for advancing the tube linearly relative to the wire to locate the loops at spaced apart points along the length of the tube, said looping means including a spindle head having a wire-receiving surface with two wire-looping pins thereon, said head having an opening through which the tube is directed to be located between said pins.

5. A machine for forming an extended surface wire and tube heat exchanger comprising, means for relatively differentially rotating the tube and wire with respect to one another, means for looping predetermined portions of the wire with respect to the tube to form continuously angularly advanced loops on the outer surface of the tube along the length thereof, and means for advancing the tube linearly relative to the wire to locate the loops at spaced-apart points along the length of the tube, said looping means including a spindle head having a wire receiving surface with two wire-looping pins thereon, said head having an opening through which the tube is directed to be located between said pins, said means for advancing the tube including means for varying the rate of advance of said tube.

6. A machine for forming an extended surface wire and tube heat exchanger comprising, means for relatively differentially rotating the tube and wire with respect to one another, means for looping predetermined portions of the wire with respect to the tube to form continuously angularly advanced loops on the outer surface of the tube along the length thereof, and means for advancing the tube linearly relative to the wire to locate the loops at spaced-apart points along the length of the tube, said looping means including a spindle head having a wire-receiving surface with two wire-looping pins thereon, said head having an opening through which the tube is directed to be located between said pins, said means for advancing the tube including means for varying the rate of advance of said tube, said means for advancing the tube including wire-camming means engaging wire on said pins for forcing the wire loops therefrom, displacement of wire from said pins causing linear movement of said tube.

PO-1050
(5/69)

UNITED STATES PATENT OFFICE
CERTIFICATE OF CORRECTION

Patent No. 3,591,910                     Dated July 13, 1971

Inventor(s) Byron L. Brucken

It is certified that error appears in the above-identified patent and that said Letters Patent are hereby corrected as shown below:

Column 2, line 67, "which" should be -- with --.
Column 3, line 62, "ro" should be -- to --.
Column 4, line 29, "24" should be -- 124 --.
Column 4, line 62, "periphery of" should be -- loops --.
Column 5, line 16, "182 illustrated" should be -- 182 is illustrated --.
Column 6, line 61, "to" should be -- along --.

Signed and sealed this 25th day of January 1972.

(SEAL)
Attest:

EDWARD M. FLETCHER, JR.                ROBERT GOTTSCHALK
Attesting Officer                      Commissioner of Patents